Feb. 25, 1964  G. L. WELLS ETAL  3,121,910
CARCASS SPLITTING SAW FLUSHING SYSTEM
Filed Nov. 22, 1961
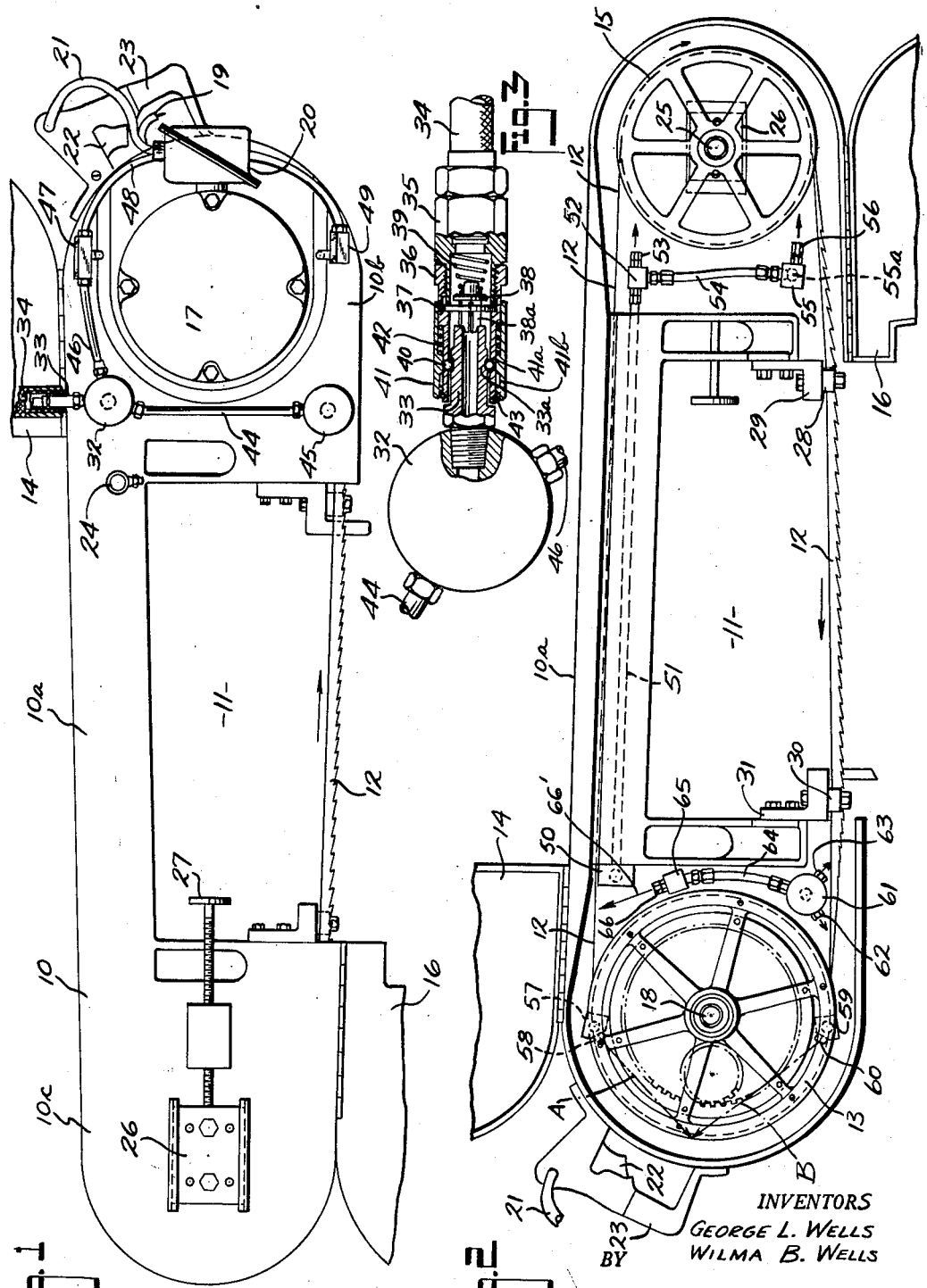
INVENTORS
GEORGE L. WELLS
WILMA B. WELLS
BY
Meyer, Baldwin, Doran & Egan
ATTORNEYS

United States Patent Office 3,121,910
Patented Feb. 25, 1964

3,121,910
CARCASS SPLITTING SAW FLUSHING SYSTEM
George L. Wells and Wilma B. Wells, both of 25521 Wolf Road, Bay Village, Ohio
Filed Nov. 22, 1961, Ser. No. 154,309
3 Claims. (Cl. 17—23)

This invention relates to improvements in a flushing system for a carcass splitting saw.

A compelling need for the present invention arises when cattle, hogs, or the like, are being split by the use of a power driven saw and it comes to the attention of the operator that the saw has just passed through a diseased carcass. For sanitary and health reasons, and generally under legal compulsion, it is necessary to then thoroughly clean and sterilize the saw before another animal is touched therewith. An object of the present invention, therefore, is to provide a means for quickly and thoroughly sterilizing and cleansing such a carcass splitting saw without undue loss of time on the assembly line.

The details and operation of the present invention are hereafter further set forth in the accompanying specification and the essential features thereof are defined in the appended claims.

In the drawings,

FIG. 1 is a side elevation presenting an outside view of a housing of a carcass splitting saw equipped with the present invention;

FIG. 2 is a side elevational view of the device of FIG. 1 taken from the opposite side and showing the interior mechanism within the housing, of which the doors are shown in open position; while FIG. 3 is a detailed and enlarged view partly in section taken through a quick-connect valve appearing at the top of FIG. 1.

While the present invention might be adapted to various types of carcass splitting saws, we have chosen to show the same as applied to an endless band saw of this type which is more fully described and claimed in our copending application Serial No. 123,532, filed July 12, 1961, for "Method and Apparatus for Splitting an Animal Carcass." For a clearer understanding of the present invention, the above-mentioned saw may be briefly described herein as follows.

The housing 10 comprises two end portions rigidly connected by an elongated intermediate portion 10a thus leaving an opening 11 through which the carcass splitting saw blade 12 operates in the direction of the arrow of FIG. 1 in its working direction, although it might work in the opposite direction. The end portion 10b of the housing encloses a driving pulley 13 and this end is closed by means of a hinged door 14. The housing end 10c encloses an idler pulley 15 and this end of the housing is closed by a hinged door 16. To the outside of the housing at the end 10b is bolted a motor 17 which has a drive shaft 18 extending inside of the housing and drivingly connected to the pulley 13. Electric power is supplied to the motor 17 from an outside connection 19 through a junction box 20, conductor 21 and a switch (not shown) under the control of a trigger actuator 22 conveniently placed adjacent the handle 23 by which the saw is manipulated. It will be understood by those familiar with this art that the saw is customarily suspended from overhead through the ring 24 attached to the housing 10 so that the saw is easily manipulated.

In the housing end 10c, the pulley 15 is rotatable on a shaft 25 which has suitable bearings in the housing 10. As more completely disclosed in the above-mentioned copending application, the bearings for the pulley 15 are adjustable through a plate 26 slidably mounted on the housing 10 and adjustable by means of the screw 27 so as to adjust the tension on the endless saw blade. As clearly seen in FIG. 2, this blade is endless and is presented edge-on toward the viewer around the pulleys 13 and 15 and through the housing portion 10a. The blade is turned through approximately 90 degrees on its working run as seen in the lower central portion of FIGS. 1 and 2. This turning is accomplished between parallel rollers 28 rotatably mounted in a bracket 29 at the housing end 10c and further guided by another set of two parallel rollers 30 mounted in the bracket 31 at the end of the saw housing 10b.

While the flushing system hereinafter described places certain manifolds and piping on the outside of the housing 10, and other parts inside of the housing, it should be understood that the necessary piping and fittings may be arranged according to the size of the saw and the housing and the essential part of the invention resides not in the specific position of the pipes and fittings but in the functioning of the spray jets and their connection to a suitable source of fluid.

In the present embodiment a master manifold fitting 32 is secured to the outside of the housing 10 in a position adjacent the motor 17 toward the handle end of the saw. Communicating with this fitting is an upstanding nipple 33 adapted to connect to an outside source of pressure fluid. A preferred form showing a quick-connect valve is clearly shown in FIGS. 1 and 3. The drawings shows a known valve having a connection with a hose 34 which communicates with any chosen source of cleaning fluid, such as very hot water. The fitting 35 has threaded to it a second fitting 36 which holds in place a valve seat 37. A poppet valve 38 is adapted to close the opening in seat 37 and is urged in that direction by a spring 39. The poppet valve has an axial extension 38a adapted to fit into the end of the nipple 33 to control movement of the valve between closed and open positions. To maintain the connection, a plurality of balls 40 are held in suitable openings in a sleeve portion of the member 36. In FIG. 3, the balls are shown engaged in a recess 33a in the nipple 33. The valve is shown in open position in FIG. 3. To close the valve, a sleeve 41 surrounding the left end of the member 36 is pushed toward the right as viewed in FIG. 3 against the urging of a spring 42 so as to clear the annular shoulder 41a from its position retaining the balls 40 in a radial inward position, to a second position where an annular recess 41b lies radially outside of the balls 40. When the parts are in this condition, the nipple 33 can be removed relatively from the fitting connected to the hose so that the nipple and fitting are withdrawn from each other, thus permitting the spring 39 and hose pressure to close the valve 38. The member 43 is an O-ring seal. Thus, when the quick-connect valve is opened by engagement with the nipple 33 the complete flushing system about to be described goes into immediate action with all of the high impact spray nozzles working together at the same time to wash away all debris within the saw and its housing, such as bone dust, fat and meat particles, thoroughly cleaning the inside surfaces of the frame housing, the pulleys, and the saw blade itself. When the quick-connect valve is disengaged from the nipple 33, then all flushing liquid is immediately cut off and all cleaning and washing action within the housing 10 instantaneously stops.

As seen in FIG. 1, on the outside of the housing the manifold 32 is connected by a stainless steel pipe 44 with a fitting 45. The manifold 32 is also connected by pipe 46 with a fitting 47 which in turn is connected by a curved pipe 48 with a fitting 49. The flushing connections inside of the housing 10 are best shown in FIG. 2. A short nipple passing through the housing wall connects the manifold 32 with a fitting or junction box 50. This, in turn, is connected by means of a stainless steel pipe 51 which extends through a hollow section beam member between the two ends of the housing 10 and connects at the idler pulley end of the saw with a fitting 52. This fitting 52 is equipped with a jet spray 53 directed to a point on the inside of the housing near where the saw blade 12 passes onto the idler pulley 15. The fitting 52 is connected by a pipe 54 with another fitting 55 which in turn carries a jet 56 which is directed toward the inside of the housing near the bottom of the pulley 15. Going back to the fitting 47, this is connected by a short nipple through the wall of the housing 10 to a fitting 57 which is equipped with a spray jet 58 which is turned to spray in the direction of the arrow A of FIG. 2. The fitting 49 is connected by a short nipple through the housing wall to a fitting 59 inside of the housing and carrying a jet 60 which directs a spray as shown by the arrow B of FIG. 2. Preferably, the jets A and B meet at a point approximately midway of the diameter of the drive pulley 13 or at the maximum limit of the curvature of the left end of the housing as shown in FIG. 2. These jets then are enabled to clean the pulley and the housing around a semi-circle and splash back to clean the fittings 57, 59, and the jets 58 and 60. The fitting 45 is connected by a short nipple through the housing wall with a manifold fitting 61 on the inside of the housing. This fitting 61 is connected with jet 62 directed downwardly and toward the housing at the point where the blade 12 is about to enter into contact with the drive pulley 13. A second jet 63 connected into manifold 61 is directed downwardly and in a direction somewhat opposite to jet 62 to clean the housing and the blade 12 as it approaches the left end of the path as shown in FIG. 2 of the drawings. Manifold 61 is connected by pipe 64 to a fitting 65 which carries a spray jet 66 directed upwardly as indicated by the arrow 66' in FIG. 2. Preferably, but not necessarily, this jet 66 is a widely dispersed spray covering approximately 80 degrees but in any case it is directed toward the housing where saw blade 12 leaves the drive pulley 13.

Preferably, in the case of each of the fittings 52, 55, 57, 59, 61 and 65, there is provided within the fitting a reservoir or cavity for the purpose of building up pressure at each of the nozzle sprays. This has been illustrated in fitting 55 where the cavity 55a is provided between the fittings which are screwed into the fitting 55 but this showing has been omitted from the drawings of the other fittings for clarity of the drawing.

The operation of this invention should now be apparent. If a cleaning of the saw is indicated to the operator as, for instance, because he has just cut through a contaminated carcass, or for quick, periodic cleaning throughout the work period, or for any other reason, the hose 34 with the attached fittings is connected to the nipple 33 whereupon sterilizing fluid under pressure is immediately conducted to the entire system through the master manifold 32. The jets 62 and 63 clean the band saw blade 12 as it approaches the drive pulley 13 which preferably is maintained in operation to keep the saw blades moving during the cleaning operation. It will be understood that the opening 11 in the saw housing is held over a suitable tank or other receptacle for the liquid and debris washed out of the saw housing. The jets 58 and 60 clean out completely the left end of the housing as previously described. The jet 66 cleans the housing and also the blade 12 as it leaves the drive pulley and carries a stream of cleaning fluid by the moving saw blade 12 between pulleys 13 and 15. It should be understood that the blade 12 is moving at 1500 to 1800 feet per minute so that liquid is rapidly carried along the blade. The pulley 13 and the handle end of the housing are cleaned by the joint action of jets 58, 60, 62 and 66. At the opposite end of the housing the jets 53 and 56 clean the housing and the pulley 15 and further help with additional cleaning of the blade 12 as it passes around pulley 15. The jet 56 cleans the housing and the blade 12 before it passes through the guide rollers 28. The jet 63 aids in keeping the guide rollers 30 in a clean condition. It takes but a moment to completely clean out the housing 10, the blade, the pulleys and the guide rolls and all other parts in contact with the blade. The operator then disconnects nipple 33 from the hose connection whereupon all flushing action stops and the operator is ready to approach the next sawing operation.

We have found that the jet 56 is not always necessary when cutting beef although it appears to be necessary at all times when cutting hog carcasses.

It will be understood by those skilled in this art that wherever parts, tubing and passageways are shown connected in the general flushing system, the pipe sizes and passageways dimensions are so arranged as to get an even flow of flushing liquid to all parts of the housing at once. For instance restrictions were found necessary in the passageways leading to the fittings 57 and 59 so as to insure that the flushing fluid flowed in sufficient quantity to the opposite end of the housing.

The drawings show the flushing system of this invention as applied to a band saw housing wherein the blade of the saw travels in the direction of the arrow shown in FIG. 1. It will be understood that if the blade travels in the opposite direction, the arrangement of the flushing jets shown in this invention may be reversed end for end in the housing so that converging jets like those shown at 58 and 60 impinge upon that end of the housing where the largest amount of debris collects, driven there by the travel of the saw blade.

What is claimed is:

1. In a carcass-splitting saw comprising a housing, two pulleys in said housing spaced from each other and rotatable on parallel axes, means for driving one of said pulleys, the other of said pulleys being an idler pulley, and endless saw blade passing around and between said pulleys and driven thereby, said housing completely shrouding said pulleys and formed arcuately about them at opposite ends and having a hollow beam connecting said opposite ends, said housing having an open side opposite said beam and said endless blade passing through said hollow beam and along said open side; the combination therewith of a flushing system comprising spray jets fixed relative to said housing and positioned to spray a fluid against the inside walls of said housing and onto said pulleys and said blade, two of said spray jets directed to strike said blade and pulley and housing near the points where said blade passes onto and off of said idler pulley respectively, two of said spray jets positioned respectively near the top and bottom of said driven pulley and directed to strike said housing at approximately the mid-point of the arcuate end about said driven pulley, one of said spray jets positioned to strike said blade near the point where it passes onto said driven pulley, one of said jets positioned to strike said housing at a zone adjacent the point where said blade passes off of said driven pulley, a conduit passing through said hollow beam and connecting said two first named spray jets in circuit with the rest of said spray jets, all of said jets communicating in a common conduit system, and one fluid inlet for said conduit system accessible from outside said housing.

2. A flushing system for a carcass-splitting saw as set forth in claim 1, wherein each of said spray jets includes a close-coupled fitting for conducting pressure fluid to the associated jet, and there being a small reservoir for pressure fluid in each said fitting, whereby to insure an immediate supply at the established pressure when said jet is activated.

3. A flushing system for a carcass-splitting saw as set forth in claim 1 including at said one fluid inlet a quick-connecting coupling and valve automatically opened and closed respectively by connecting and disconnecting said coupling.

References Cited in the file of this patent
UNITED STATES PATENTS

| | | |
|---|---|---|
| 602,943 | Hinkley | Apr. 26, 1898 |
| 1,750,223 | Grant et al. | Mar. 11, 1930 |
| 2,994,911 | Liebmann | Aug. 8, 1961 |